United States Patent
Gruber

[15] 3,679,856
[45] July 25, 1972

[54] DEVICE FOR THE MANUFACTURE OF WELDED STEEL PIPE FROM STEEL OF ANY GRADE

[72] Inventor: Kurt Gruber, Monchengladbach, Germany

[73] Assignee: Mannesmann-Meer Aktiengesellschaft, Monchengladbach, Germany

[22] Filed: May 21, 1970

[21] Appl. No.: 41,664

Related U.S. Application Data

[63] Continuation of Ser. No. 700,350, Jan. 24, 1968.

[30] Foreign Application Priority Data

Jan. 25, 1967 Germany..............................M 72538

[52] U.S. Cl................................................219/59, 219/124
[51] Int. Cl.............................................................B23k 31/06
[58] Field of Search....................219/59, 60, 61, 64, 67, 124, 219/125, 137

[56] References Cited

UNITED STATES PATENTS

| | | | |
|---|---|---|---|
| 1,298,590 | 3/1919 | Smith | 219/60 X |
| 2,023,897 | 12/1935 | Neckerman | 219/59 X |
| 2,024,485 | 12/1935 | Sussman | 219/59 |
| 2,084,889 | 6/1937 | Blevins | 219/59 |

Primary Examiner—J. V. Truhe
Assistant Examiner—L. A. Schutzman
Attorney—Marmorek and Bierman

[57] ABSTRACT

A device for welding of soft steel pipe by resistance welding and of high-alloyed steel pipe by arc welding. It consists of two ways, one for each type of welding, which are synchronized to the machines for the preparation of the steel band and its shaping into a split tube. Because arc welding proceeds at considerably lower speed than resistance welding, a plurality of welders are provided together with means for assigning each split pipe length to one such arc welder. The combination of two different welding ways enables manufacture of seamed pipe from any grade of steel, a reduction of bulged-out end waste, perfect deburring of the seam and savings in time when changing dimensions, using high-alloyed steel.

4 Claims, 3 Drawing Figures

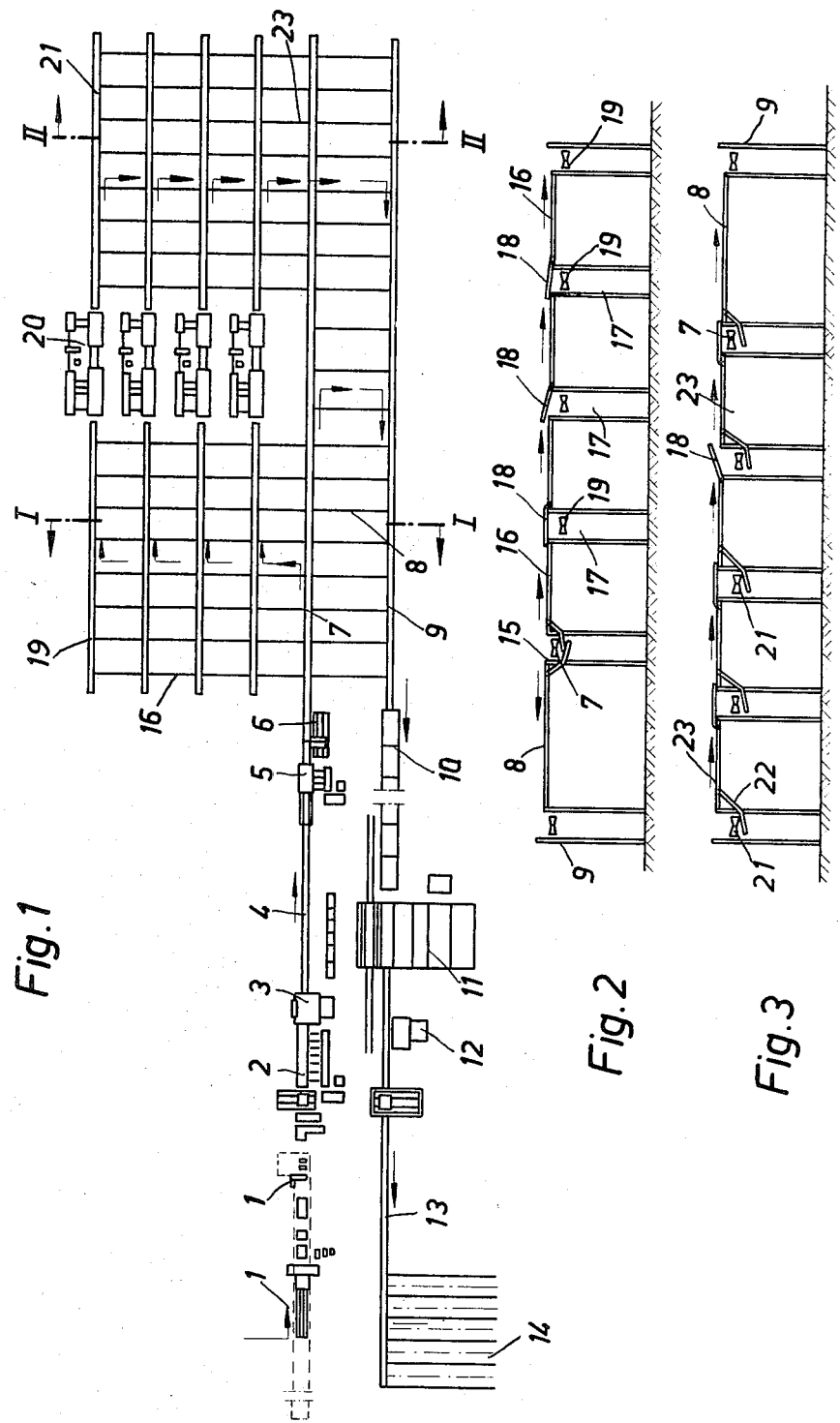

DEVICE FOR THE MANUFACTURE OF WELDED STEEL PIPE FROM STEEL OF ANY GRADE

This is a continuation of U.S. Pat. application Ser. No. 700,305, filed Jan. 24, 1968, and now abandoned.

Welded steel pipe for gas and water conduits of all kinds are manufactured with the use of reducing drawing roller mills. A steel band, usually from a coil, is shaped into a split tube by a number of shaping frames which then is welded, using low- or high-frequency currents. The welded pipes are subjected to stretch reduction.

This procedure has the disadvantage that it is limited to soft steels which are readily welded and have comparatively low carbon and alloying contents. Therefore, devices working according to such a process are applicable only to steel pipe of low strength characteristics. They cannot be employed for pipe resistant to high internal pressures or for pipe made of high-temperature (heat-resistant) and corrosion-resistant steel types.

The reason for this inapplicability of the devices is found in the great difficulties encountered in welding the edges of such steels faultlessly and safely by the resistance pressure welding process. Regardless of whether the edges are heated to welding temperature by high- or low-frequency current, pressure butt welding must be resorted to, i.e., this method is limited by the quality of the welding seam which is insufficient for the purposes named.

For higher quality steel, a suitable arc welding process therefore must be employed which permits welding of the split tube edges in the presence of a protective gas or by submerged arc welding, with or without a weld wire or rod.

It is the object of the invention to provide a device which permits welding of steel pipe made from any desired kind of steel.

The obvious idea simply to exchange the welding bench carrying electric resistance welding gear against devices for arc welding and to use the arrangement depending on which type steel is to be fabricated, has the drawbacks that the economy of the entire, very expensive plant is imperiled, hence, cannot be realized in practice because the production, in the instance of arc welding, is lowered to 1/20—1/30 of that of resistance welding, and this is highly uneconomical.

The plant according to the invention facilitates welding of steel pipe having low strength characteristics by resistance welding and, by switching off from the resistance welding device, welding of high-strength steel split tube in arc welding machinery. The economy is determined by the number of arc welding machines which is selected in consideration of the output of seamless high-alloyed steel pipe from conventional tube rolling mills.

The technological progress attained with the device according to the invention is discernible from the following example:

Assuming that a finished high strength tube of 194 × 6 mm is to be rolled on a pilger machine from an ingot of 230 × 30 mm, the machine produces approximately 1.8 m pipe per minute (60 strokes per minute, 15 mm feed, stretch 1:2). In order to match or surpass this output upon arc welding of a split tube of like dimensions and quality, at least two arc welders are required at a welding speed of 1.4 m/min.

Depending upon the dimensions of the pipes to be completed, the number of simultaneously acting arc welders hence is increased so that at least the same output is attained as that of a roller mill for high-alloyed seamless pipe.

The throughput speed of the endless band through the shaping mill, using arc welding machines, thereby is to be adjusted to this welding speed in such a manner that the selected number of arc welders always is fed simultaneously. For reasons of transportation, the lengths of tubes cut may differ, and suitable lengths for induction welding are 60 to 90 m, for arc welding approximately 40–45 m.

Since the plant according to the invention provides a reducing drawing roller mill to improve the welding seam, the economy of the total device is increased owing to the considerable stretch of the tubes fed in and, in addition, due to the decrease of bulged-out ends. Furthermore, because the number of arc welding machines can be increased at will, production results can readily be obtained which are considerably higher than those in comparable rolling mills for the manufacture of high-alloyed seamless pipe.

Aside from the faultless control of the quality of the weld due to slow welding speed by arc welding, the additional advantage is obtained for the decisively important internal and external deburring of the welding seam which, in view of the slow speed, can be executed in a particularly precise manner.

Finally, the advantage of rapid change in the dimensions hitherto attained only with soft steel pipes, can be extended to high-alloyed quality steels due to the employment of stretch reduction.

The invention now will be more fully explained with reference to the accompanying drawings. However, it should be understood that this is given merely by way of illustration, and not of limitation, and that it is intended to cover all modifications and variations which do not constitute a departure from the spirit and the scope of the invention as hereinafter claimed.

In the drawings,

FIG. 1 is a plan view, in schematic, of the entire plant for the manufacture of steel pipe from any kind of steel;

FIG. 2 is a section taken along lines I—I of FIG. 1; and

FIG. 3 is a section taken along lines II—II of FIG. 1.

Referring now to these drawings, as shown in FIG. 1, the entire plant for a continuous resistance welding installation is composed of device 1 for the preparation of the steel band, a shaping roller mill 2 with adjoining resistance welding installation 3, a cooling zone 4, calibrating rollers 5, a follower saw 6, a roller bed 7, transverse grating 8, pull-off roller bed 9, a continuous (or pusher type) oven 10, reducing drawing roller mill 11, a rotating saw 12, delivery roller bed 13, and cooling bed 14; furthermore of ejectors 15 for branching off the split tubes to grates 16 (FIG. 2) and controls 17 for the respective intake rollers 19, where, by way of flaps 18, the split tube is diverted to rollers 19 and carried to arc welders 20. Thence, as shown in FIG. 3, the welded pipe proceeds to roller beds 21, where, by means of ejectors 22 a lateral diversion to grates 23 occurs. These pull the pipes in transverse direction, actuated by flaps 18, to such an extent that the pipes, one after the other, are deposited on roller bed 9 where they pass, in opposite direction from the inlet, through oven 10 and through roller mill 11; then are freed from bulging-out ends by rotating saw 12, carried over deliver roller bed 13 to cooling bed 14, where they are cut into commercial size lengths and carried off to distributing devices.

The procedure is as follows.

A. Resistance Welding Fabrication of Soft Steels

The band rolls off a coil through band preparation devices 1 to shaping rollers 2, where it is shaped into a split tube. It passes to resistance welder 3 where it obtains a welding seam at comparatively high speed. The welded tube then is conducted, by way of cooling zone 4, to calibrating rolls 5 and, after leaving the same, is divided into lengths up to 90 m, if desired even longer, by follower saw 6. The tubes then proceed to roller bed 7, are lifted to transverse grating 8 by ejectors 15. Grating 8 has a slight inclination and deposits the pipes, transversely to their intake direction, on pull-off roller bed 9, whence they pass oven 10 and reducing drawing mill 11. Rotating saw 12 adjoins the oven and removes the bulged-out ends, and the pipe now passes over delivery roller 13 and into cooling bed 14.

B. Arc Welding Fabrication of Hard Steel

Welding arrangement 3, cooling zone 4 and calibrating rolls 5 are inactivated. The procedure then is as follows: The band rolls of the coil to band preparation devices 1 and to shaping rollers 2 whose throughput speed has been adjusted to the welding speed. The split tube formed is divided into suitable lengths by follower saw 6, and these lengths are deposited on grates 16 by ejectors 15 in roller bed 7. The tubes are carried to rollers 19 from grates 16 by means of synchronized flaps 18 in intake rollers 17, dependent on the number of arc welders, and are carried to the assigned arc welder 20. There, with the slit pointing upwardly, they are welded into seamed pipe.

The welded pipes leave welders 20 by way of roller beds 21, ejectors 22 and transverse grates 23 and are carried to transverse grates 8 by way of roller bed 7, are deposited by pull-off rollers 9 and change direction to traverse oven 10 and reducing drawing roller mill 11. They pass rotating saw 12 where they are freed from bulging-out ends, over delivery roller bed 13 and to cooling zone 14 for further disposition.

The combination of two different welding installations according to the invention enables the manufacture of seamed pipe of different types of steel, the increase in the output of high-alloyed steel pipe, the reduction of bulged-out end waste, faultless deburring of the internal and external surfaces of the seams, and considerable savings in time when changing the dimensions in the reducing drawing roller mill, using high-alloyed steel.

It should be understood that the arrangement shown in FIG. 1 is one actually used and is limited by the available space, and that it is, of course, feasible to set the individual units in succession without a reversal and that the installation can be varied to the requirements or availability of space.

I claim:

1. A device for welding split pipes made of soft steel and of high alloyed steel, respectively, comprising in combination, a processing way common to said soft steel split pipes and to said high alloyed steel split pipes, said way including a high speed welding machine operable for welding soft steel pipes at a high travel speed and for passing without welding said high alloyed steel split pipes therethrough at said high travel speed, a follower cutting device for selectively cutting pipes into predetermined pipe sections, and a high speed conveying line communicating with the output of said cutting device and being operable for forwarding at said high travel speed pipe sections for further processing, and a group of low speed welding ways for high alloyed steel pipes, said ways being arranged substantially parallel to each other and to said high speed conveying line and each including a feeding track section, a discharging track section, and a low speed welding machine disposed between said feeding and discharging track sections and operable for welding said high alloyed steel pipes at a low travel speed whereby the total welding output of said low speed welding machines is synchronized with the output of said high speed welding machine, a high speed transverse feeding conveyor cooperating with an upstream portion of said high speed conveying line and with said feeding track sections for successively forwarding at said high travel speed unwelded high alloyed steel pipe sections from the upstream portion of said conveying line onto feeding track sections of individual low speed welding ways, a high speed transverse discharging conveyor cooperating with said discharging track sections in said group of welding ways and with a downstream portion of said conveying line for forwarding successively at said high travel speed welded high alloyed steel pipe sections from said discharging track sections onto said downstream portion of said high speed conveying line, control means for alternatively putting into operation said high speed welding machine for soft steel pipes and said low speed welding machines for high alloyed steel pipes, respectively, and first switching means operable for selectively diverting the travel of said unwelded high alloyed steel pipe sections from said upstream portion of said high speed conveying line to said transverse feeding conveyor when said low speed welding machines are operated.

2. A device according to claim 1, further comprising a take-off transverse grading adjacent said conveying line opposite said feeding and discharging transverse conveyors, a take-off conveying bed arranged alongside the output of said take-off transverse grading in counter direction to said conveying line for forwarding welded pipe sections for further processing, and second switching means operable for diverting the travel of welded pipe sections from said high speed conveying line via said take-off transverse grading onto said take-off conveying bed.

3. A device according to claim 1 further comprising means for adjusting said cutting device to cut during the high speed welding operation the welded pipes substantially in lengths exceeding the length of said feeding track sections, and during the low speed welding operation to cut the unwelded pipes in the lengths within the range of said feeding track sections.

4. A device according to claim 1 wherein said soft steel welding machine is a resistance welding machine and said high alloy steel welding machine is an arc welding or an inductive welding machine.

* * * * *